United States Patent
Schülke et al.

(10) Patent No.: US 6,519,523 B2
(45) Date of Patent: Feb. 11, 2003

(54) METHOD AND DEVICE FOR DETERMINING AN UNSTABLE DRIVING CONDITION OF A MOTOR VEHICLE

(75) Inventors: Armin Schülke, Renningen (DE); Armin-Maria Verhagen, Schwieberdingen (DE); Roland Stoller, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/728,339

(22) Filed: Dec. 1, 2000

(65) Prior Publication Data
US 2001/0021885 A1 Sep. 13, 2001

(30) Foreign Application Priority Data

Dec. 4, 1999 (DE) ........................ 1 99 58 492

(51) Int. Cl.[7] ........................... G01P 15/00; B60K 28/16
(52) U.S. Cl. ........................................... 701/70; 701/72
(58) Field of Search ...................... 701/72, 70; 303/146

(56) References Cited

U.S. PATENT DOCUMENTS

| | | | | |
|---|---|---|---|---|
| 4,898,431 A | * | 2/1990 | Karnopp et al. ............. 303/146 |
| 5,259,476 A | * | 11/1993 | Matsuno et al. ............. 180/197 |
| 5,710,704 A | * | 1/1998 | Graber ........................ 180/197 |
| 6,155,655 A | * | 12/2000 | Matsuno ...................... 303/140 |
| 6,216,061 B1 | * | 4/2001 | Franke et al. .................. 701/1 |

FOREIGN PATENT DOCUMENTS

| | | |
|---|---|---|
| DE | 35 45 716 | 6/1987 |
| EP | 0 781 695 | 7/1997 |
| GB | 2257551 | 1/1993 |
| GB | 2323454 | 9/1998 |

* cited by examiner

Primary Examiner—Michael J. Zanelli
(74) Attorney, Agent, or Firm—Kenyon & Kenyon

(57) ABSTRACT

A method and a device in which, during the cornering of a motor vehicle, a rating factor is determined by comparing a computed lateral acceleration with a measured lateral acceleration. The lateral acceleration is measured, for example, using an acceleration sensor or corresponding yaw-rate sensor. The computed lateral acceleration is calculated via the steering angle and the road speed. A weighted rating factor generated from the difference signal is a measure of the stable or unstable driving condition of the motor vehicle. This rating factor can be either displayed or supplied to an additional control unit, for example an automatic transmission, a suspension control system or an engine management system.

13 Claims, 2 Drawing Sheets

METHOD AND DEVICE FOR DETERMINING AN UNSTABLE DRIVING CONDITION OF A MOTOR VEHICLE

BACKGROUND INFORMATION

German Patent No. 35 45 716 describes an arrangement for controlling the propulsion of motor vehicles by decreasing the output torque of the vehicle engine or braking the appropriate wheel to prevent undesired spinning of the driven wheels of the vehicle when their slip exceeds a set threshold. For this purpose, the lateral acceleration of the vehicle is measured using a cornering detection arrangement and analyzed in an appropriate device.

The known device operates independently of the instantaneous steering-wheel angle arising from the instantaneous driving situation of the vehicle, especially in a skid (unstable driving condition). If the vehicle tries to spin out, the driver automatically countersteers to keep the vehicle under control. This effect is not taken into account.

SUMMARY OF THE INVENTION

The method and the device according to the present invention have the advantage that an unstable driving condition of the motor vehicle can be detected using a simple steering-angle sensor without the need for any elaborate measures such as road maps and measuring the radius of the curve.

It is particularly advantageous to weight the computed difference between the measured and the computed lateral acceleration using a rating factor in such a way that a clear distinction can be drawn between a stable and an unstable driving condition of the motor vehicle. If the rating factor is 1, a stable driving condition is present. If the value is 0, the driving condition is unstable. A simple corrective signal can advantageously be derived from this and displayed or supplied to additional control units for automatic transmission, suspension control, etc.

To prevent any abrupt changes in a setpoint value within the transition range between stable and unstable driving conditions, this range is advantageously realized as a slope.

It is further advantageous that the rating factor is output visually through a display element or acoustically through a speaker, so that the driver is alerted to a critical driving condition of the motor vehicle.

A further advantage is seen in the fact that the rating factor is supplied to a further control unit, which is implemented, for example, for suspension control or an automatic transmission. In this way, for example, the automatic transmission can be prevented from shifting into the next-higher or next-lower gear during cornering.

It is favorable, furthermore, that the computed lateral acceleration is weighted with model-specific data of a specific motor vehicle. This makes it possible to adapt the lateral acceleration, in combination with the road speed, to the specific characteristics of the vehicle.

DETAILED DESCRIPTION

Figure 1:
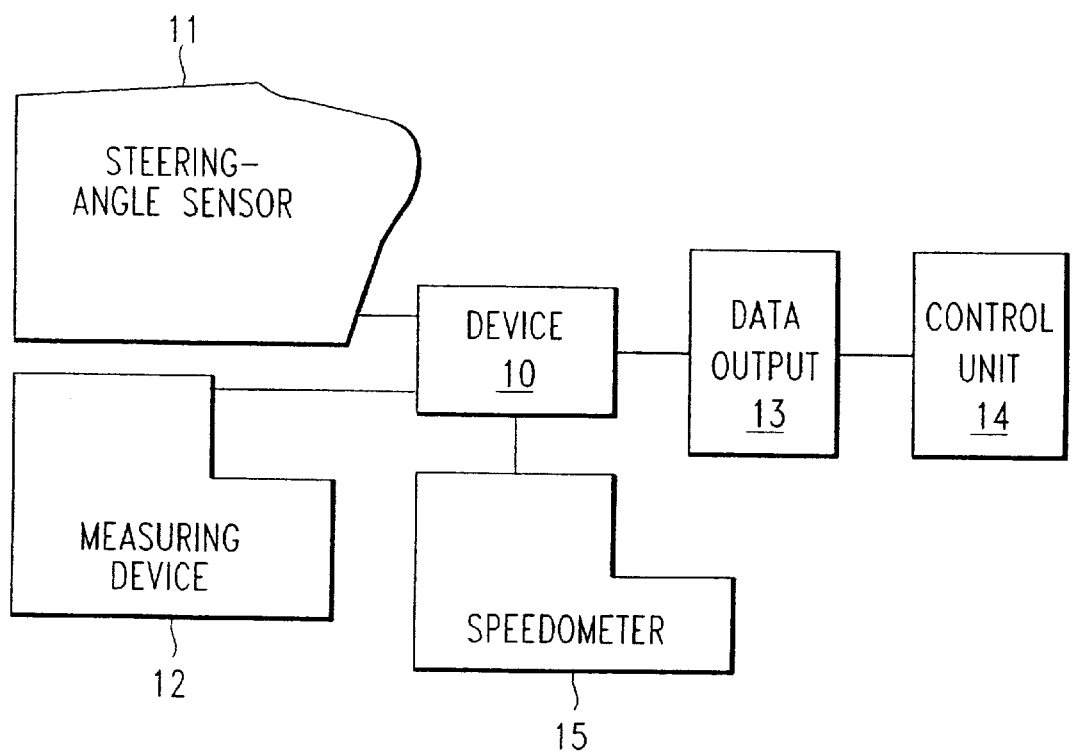
FIG. 1 is a block diagram, according to the present invention.

The block diagram of FIG. 1 shows a device 10 in which a computer, using a small computer program, analyzes signals measured by a steering-angle sensor 11 and a measuring device 12. Also connected to the device 10 is a speedometer 15 that detects the instantaneous road speed. Alternatively, this speedometer 15 can already be a component of an additional control unit of the motor vehicle. Connected to one output is a data output 13 realized, for example, as an indicating element or display. The data output 13 displays the unstable or stable driving condition of the motor vehicle. Provided at data output 13 is an output that can be connected to a control unit 14 for an automatic transmission, a suspension control system or the engine management system. The measuring device 12 may be used to measure the lateral acceleration. In an alternative embodiment of the present invention, it is provided that the measuring device 12, instead of measuring the lateral acceleration, measures the yaw rate of the motor vehicle using an appropriate sensor.

Figure 2:
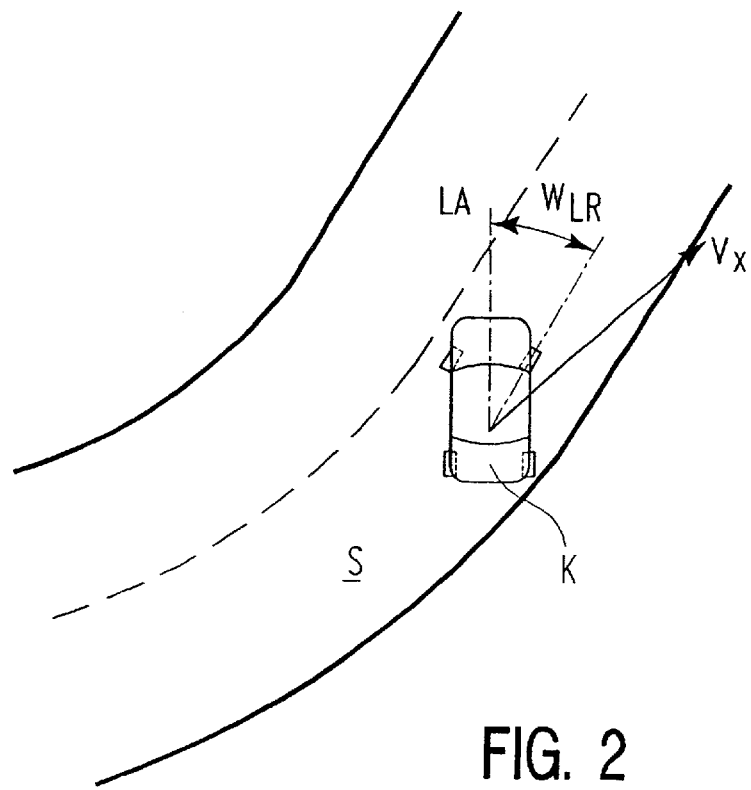
FIG. 2 shows a driving situation of a motor vehicle on a curve.

FIG. 2 illustrates a driving situation in which a motor vehicle K is on a curve in the road S. The motor vehicle K is in an unstable condition, in which at a road speed $V_x$ it goes into a skid and the rear of the vehicle oversteers. The driver now attempts to compensate by countersteering through the steering angle $w_{LR}$ (with respect to the longitudinal axis LA). The sensor 11 of FIG. 1 now detects the steering angle $w_{LR}$ and delivers the measured values to device 10.

Figure 3:
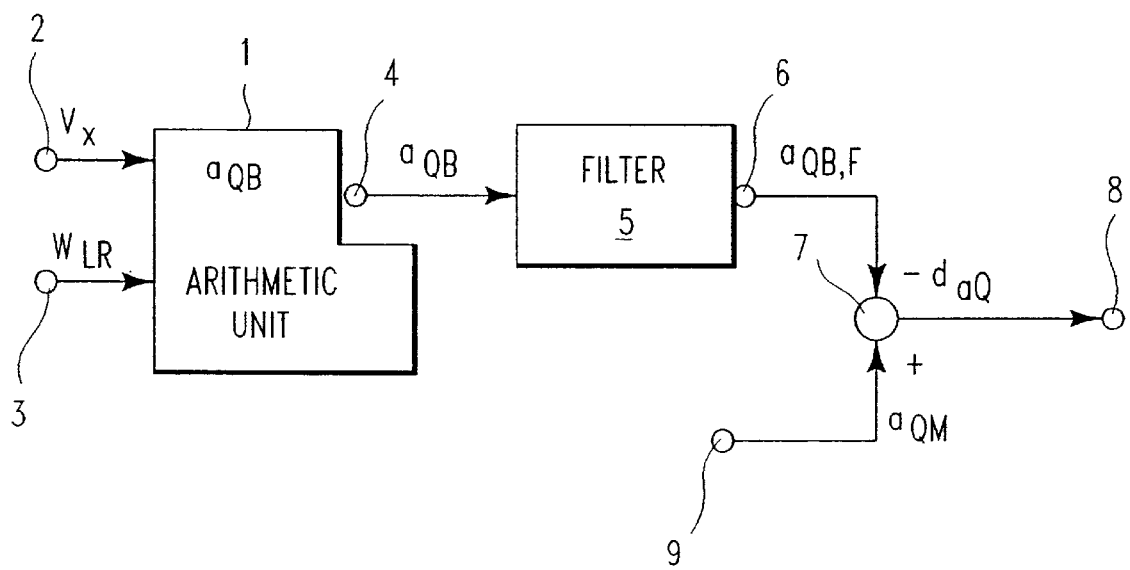
FIG. 3 is a functional sequence, according to the present invention.
Figure 4:
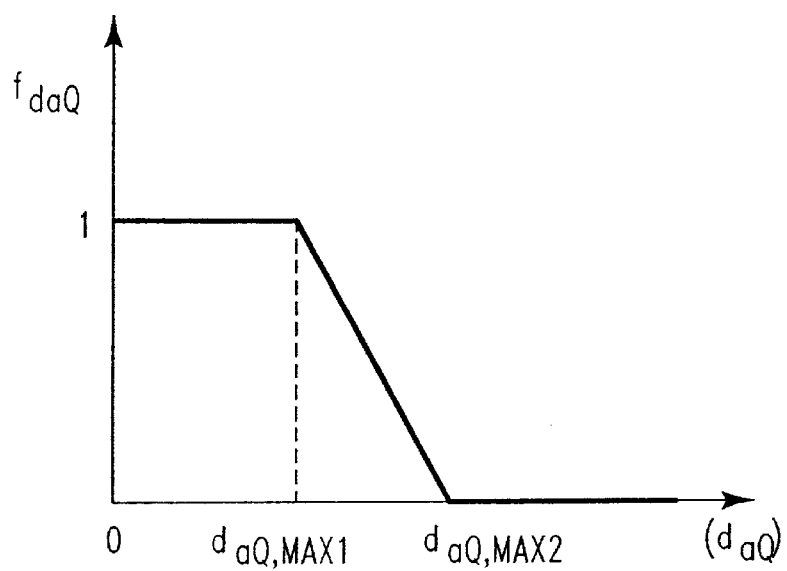
FIG. 4 is a graph, according to the present invention.

The mode of operation will now be explained in more detail with reference to FIGS. 3 and 4. FIG. 3 shows a functional sequence for measured-value processing of the kind that can, for example, be run as a program in device 10. The functional sequence of FIG. 3 is based on the consideration that in a case where a stable driving condition is present, if the measured lateral acceleration $a_{QM}$ measured by measuring device 12 using an accelerometer, or, correspondingly, the yaw velocity measured using a yaw rate sensor, is at least nearly equal to the computed lateral acceleration $a_{QB}$, which is calculated from the steering angle $w_{LR}$ and the road speed $V_X$. This means that the steering-angle data agree with the sensor data resulting from the present driving condition. The steering-angle data can be used in this case to determine the computed lateral acceleration or a comparable yaw velocity.

In the case of an unstable driving condition, on the other hand, the steering-angle data no longer agree with the measured values resulting from the lateral acceleration of the vehicle, since the driver is already countersteering. During cornering, this means that the vehicle is becoming unstable, i.e., is going into a skid. In this case, the data derived from the steering angle can no longer be used for control purposes, since they have no correlation with the actual forces acting on the motor vehicle K, i.e., they do not correspond to the actual motion of the vehicle. If such computed values were used in downstream control units, for example in an automatic transmission system, in a suspension controller or for engine management, undesirable reactions or operations would result.

The following sequence according to FIG. 3 now takes place in device 10. In an arithmetic unit 1, the speed signal $V_X$ is delivered to connecting terminal 2 and steering-angle signal $w_{LR}$ is delivered to connecting terminal 3. From these signals, arithmetic unit 1 calculates the lateral acceleration $a_{QB}$, which can be picked off an output 4. Preferably connected after output 4 is a filter 5 that functions as a delay element to compensate for the phase position. The parameters of the filter are determined by the vehicle data: the cut-off frequency and thus the time constants of the filter correspond to the transfer function for the steering angle and the lateral acceleration. The filter can, for example, be selected as a first- or second-order proportional delay filter. The filtered signal $a_{QB,F}$ is now present at output 6 and is applied to the inverted input of a summing node 7. The measured lateral acceleration signal $a_{QM}$ is delivered to the non-inverted input of summing node 7 via a further input 9. The difference signal $d_{aQ}$ is now present at an output 8 of summing node 7 for further processing.

The lateral acceleration $a_{QB}$ is calculated in arithmetic unit 1 according to the following equation:

$$a_{QB} = \frac{\tan\left(\frac{w_{LR}}{i_{Lenk}}\right)}{L} * \frac{(vx)^2}{1+\left(\frac{v_X}{v_{CH}}\right)^2}$$

where $w_{LR}$ is the steering angle,
$v_X$ the road speed,
$i_{Lenk}$ the steering ratio,
L the wheel base and
$V_{CH}$ the characteristic speed.

The difference signal $d_{aQ}$ present at output 8 is now defined with a rating factor $f_{daQ}$ and weighted according to the amount of the difference between values 0 and 1. A representative characteristic curve for the rating factor $f_{daQ}$ is shown in the graph of FIG. 4. In the coordinate system of FIG. 4, the rating factor $f_{daQ}$ is plotted on the y-axis between the values 0 and 1 and the amount of the difference $d_{aQ}$ is plotted on the x-axis. Up to a difference $d_{aq,max1}$, the rating factor $f_{daQ}$ is assumed to be 1. Above a second limit value for the difference $d_{aq,max2}$, the rating factor $f_{daQ}$ is set equal to 0. This means that at the value $f_{daQ}=1$, stable driving behavior is present, whereas at $f_{daQ}=0$, the motor vehicle will exhibit unstable driving behavior. The transition range between the two limit values $d_{aQ,max1}$ and $d_{aQ,max2}$ is in the form of a slope to prevent any abrupt changes from condition 1 to condition 0. This has the advantage that changes in the setpoint values of the connected control units are not made in an abrupt fashion. The rating factor $f_{daQ}$ obtained in this way can therefore be used as a measure of the stability of a vehicle, and used, for example, to mask out portions of a setpoint value that are dependent on the steering angle.

This method provides a simple means of deriving an output signal for a stable or unstable driving condition of a vehicle without the use of elaborate contrivances of the kind needed, for example, to control vehicle dynamics.

In a further embodiment of the present invention, it is provided alternatively or additionally to measure the yaw rate using a suitable sensor, for example a rotation-rate sensor. Further, a value for the yaw rate is calculated from the steering angle and the speed. A rating factor for the yaw rate is determined by comparing the measured and the computed yaw rate. It is further provided to average the rating factors for the lateral acceleration and for the yaw rate and to generate an average rating factor from them.

What is claimed is:

1. A method for determining an unstable driving condition of a motor vehicle, comprising the steps of:
   during a cornering of the vehicle, measuring at least one of (a) a lateral acceleration and (b) a yaw rate of the vehicle using a measuring device, and measuring a road speed of the vehicle using a speedometer;
   measuring a steering angle of the vehicle;
   computing, as a function of the steering angle and the road speed, a value of at least one of (a) the lateral acceleration and (b) the yaw rate; and
   determining at least one of (a) a first difference between the measured lateral acceleration and the computed lateral acceleration and (b) a second difference between the measured yaw rate and the computed yaw rate, and further comprising the step of generating a rating factor as a function of at least one of the first and second differences, and wherein the rating factor is weighted for the range 0 to 1.

2. The method according to claim 1, further comprising the step of delivering the rating factor to a control unit.

3. The method according to claim 2, wherein the control unit is one of an automatic transmission, a suspension control system and an engine management system.

4. The method according to claim 1, further comprising the step of weighting the computed lateral acceleration with model-specific data of the motor vehicle.

5. A method for determining an unstable driving condition of a motor vehicle, comprising the steps of:
   during a cornering of the vehicle, measuring at least one of (a) a lateral acceleration and (b) a yaw rate of the vehicle using a measuring device, and measuring a road speed of the vehicle using a speedometer;
   measuring a steering angle of the vehicle;
   computing, as a function of the steering angle and the road speed, a value of at least one of (a) the lateral acceleration and (b) the yaw rate; and
   determining at least one of (a) a first difference between the measured lateral acceleration and the computed lateral acceleration and (b) a second difference between the measured yaw rate and the computed yaw rate, and further comprising the step of generating a rating factor as a function of at least one of the first and second differences, and wherein the rating factor is realized in the form of a slope in a transition range between 1 and 0.

6. A method for determining an unstable driving condition of a motor vehicle, comprising the steps of:
   during a cornering of the vehicle, measuring at least one of (a) a lateral acceleration and (b) a yaw rate of the vehicle using a measuring device, and measuring a road speed of the vehicle using a speedometer;
   measuring a steering angle of the vehicle;
   computing, as a function of the steering angle and the road speed, a value of at least one of (a) the lateral accel-eration and (b) the yaw rate; and
   determining at least one of (a) a first difference between the measured lateral acceleration and the computed lateral acceleration and (b) a second difference between the measured yaw rate and the computed yaw rate, and further comprising the step of generating a rating factor as a function of at least one of the first and second differences, and further comprising the step of outputting the rating factor, the outputting being at least one of visual and acoustic.

7. A method for determining an unstable driving condition of a motor vehicle, comprising the steps of:
   during a cornering of the vehicle, measuring at least one of (a) a lateral acceleration and (b) a yaw rate of the vehicle using a measuring device, and measuring a road speed of the vehicle using a speedometer;

measuring a steering angle of the vehicle;

computing, as a function of the steering angle and the road speed, a value of at least one of (a) the lateral acceleration and (b) the yaw rate; and determining at least one of (a) a first difference between the measured lateral acceleration and the computed lateral acceleration and (b) a second difference between the measured yaw rate and the computed yaw rate, and wherein the lateral acceleration is computed according to the formula:

$$a_{QB} = \frac{\tan\left(\frac{w_{LR}}{i_{Lenk}}\right)}{L} * \frac{(vx)^2}{1+\left(\frac{v_X}{v_{CH}}\right)^2}.$$

8. A method for determining an unstable driving condition of a motor vehicle, comprising the steps of:

during a cornering of the vehicle, measuring at least one of (a) a lateral acceleration and (b) a yaw rate of the vehicle using a measuring device, and measuring a road speed of the vehicle using a speedometer;

measuring a steering angle of the vehicle;

computing, as a function of the steering angle and the road speed, a value of at least one of (a) the lateral acceleration and (b) the yaw rate; and determining at least one of (a) a first difference between the measured lateral acceleration and the computed lateral acceleration and (b) a second difference between the measured yaw rate and the computed yaw rate, and further comprising the step of generating an average rating factor from rating factors for the lateral acceleration and the yaw rate.

9. A device for determining an unstable driving condition of a motor vehicle, comprising:

a steering-angle sensor for measuring a steering angle;

a speedometer for measuring a road speed of the vehicle;

a measuring device for measuring at least one of (a) a lateral acceleration and (b) a yaw rate of the vehicle; and a device for calculating, as a function of the steering angle and the road speed, at least one of (a) the lateral acceleration and (b) the yaw rate of the vehicle, and for generating a rating factor as a function of at least one of (a) a difference between the measured lateral acceleration and the calculated lateral acceleration and (b) a difference between the measured yaw rate and the calculated yaw rate, wherein the rating factor is in the range of 0 to 1.

10. A device for determining an unstable driving condition of a motor vehicle, comprising:

a steering-angle sensor for measuring a steering angle;

a speedometer for measuring a road speed of the vehicle;

a measuring device for measuring at least one of (a) a lateral acceleration and (b) a yaw rate of the vehicle; and a device for calculating, as a function of the steering angle and the road speed, at least one of (a) the lateral acceleration and (b) the yaw rate of the vehicle, and for generating a rating factor as a function of at least one of (a) a difference between the measured lateral acceleration and the calculated lateral acceleration and (b) a difference between the measured yaw rate and the calculated yaw rate, wherein the rating factor is in the form of a slope in a transition range of between 1 and 0.

11. A device for determining an unstable driving condition of a motor vehicle, comprising:

a steering-angle sensor for measuring a steering angle;

a speedometer for measuring a road speed of the vehicle;

a measuring device for measuring at least one of (a) a lateral acceleration and (b) a yaw rate of the vehicle; and a device for calculating, as a function of the steering angle and the road speed, at least one of (a) the lateral acceleration and (b) the yaw rate of the vehicle, and for generating a rating factor as a function of at least one of (a) a difference between the measured lateral acceleration and the calculated lateral acceleration and (b) a difference between the measured yaw rate and the calculated yaw rate, wherein the rating factor is outputted as at least one of visual output and acoustic output.

12. A device for determining an unstable driving condition of a motor vehicle, comprising:

a steering-angle sensor for measuring a steering angle;

a speedometer for measuring a road speed of the vehicle;

a measuring device for measuring at least one of (a) a lateral acceleration and (b) a yaw rate of the vehicle; and a device for calculating, as a function of the steering angle and the road speed, at least one of (a) the lateral acceleration and (b) the yaw rate of the vehicle, and for generating a rating factor as a function of at least one of (a) a difference between the measured lateral acceleration and the calculated lateral acceleration and (b) a difference between the measured yaw rate and the calculated yaw rate, wherein the lateral acceleration is computed according to the formula:

$$a_{QB} = \frac{\tan\left(\frac{w_{LR}}{i_{Lenk}}\right)}{L} * \frac{(vx)^2}{1+\left(\frac{v_X}{v_{CH}}\right)^2}.$$

13. A device for determining an unstable driving condition of a motor vehicle, comprising:

a steering-angle sensor for measuring a steering angle;

a speedometer for measuring a road speed of the vehicle;

a measuring device for measuring at least one of (a) a lateral acceleration and (b) a yaw rate of the vehicle; and a device for calculating, as a function of the steering angle and the road speed, at least one of (a) the lateral acceleration and (b) the yaw rate of the vehicle, and for generating a rating factor as a function of at least one of (a) a difference between the measured lateral acceleration and the calculated lateral acceleration and (b) a difference between the measured yaw rate and the calculated yaw rate, wherein an average rating factor is obtained from rating factors for the lateral acceleration and the yaw rate.

* * * * *

UNITED STATES PATENT AND TRADEMARK OFFICE
CERTIFICATE OF CORRECTION

PATENT NO. : 6,519,523 B2
DATED : February 11, 2003
INVENTOR(S) : Armin Shülke et al.

It is certified that error appears in the above-identified patent and that said Letters Patent is hereby corrected as shown below:

Column 2,
Lines 43 and 65, change "$V_x$" to -- $v_x$ --

Column 3,
Line 19, change "$(vx)^2$" to -- $(v_x)^2$ --

Column 5,
Line 14, change "$(vx)^2$" to -- $(v_x)^2$ --

Column 6,
Line 43, change "$(vx)^2$" to -- $(v_x)^2$ --

Signed and Sealed this

Twenty-fourth Day of May, 2005

JON W. DUDAS
*Director of the United States Patent and Trademark Office*